(12) United States Patent
Jaillet et al.

(10) Patent No.: US 11,091,223 B2
(45) Date of Patent: Aug. 17, 2021

(54) AUTOMATIC CYCLE PEDAL

(71) Applicant: LOOK CYCLE INTERNATIONAL, Nevers (FR)

(72) Inventors: Vincent Jaillet, Urzy (FR); Gérald Paillaud, Varennes Vauzelles (FR); Vincent Holterboch, Marzy (FR)

(73) Assignee: LOOK CYCLE INTERNATIONAL, Nevers (FR)

(*) Notice: Subject to any disclaimer, the term of this patent is extended or adjusted under 35 U.S.C. 154(b) by 0 days.

(21) Appl. No.: 16/869,469

(22) Filed: May 7, 2020

(65) Prior Publication Data
US 2020/0377171 A1   Dec. 3, 2020

(30) Foreign Application Priority Data

Jun. 3, 2019 (FR) ...................... 19 05841

(51) Int. Cl.
*B62M 3/08* (2006.01)
(52) U.S. Cl.
CPC .................. *B62M 3/086* (2013.01)
(58) Field of Classification Search
CPC ................ B62M 3/086; B62M 3/08
See application file for complete search history.

(56) References Cited

U.S. PATENT DOCUMENTS

| 7,073,409 B2* | 7/2006 | Ho | B62M 3/086 |
| | | | 74/594.6 |
| 9,174,701 B2* | 11/2015 | Servignat | B62M 3/086 |
| 9,802,672 B1* | 10/2017 | Hermansen | B62M 3/086 |
| 2007/0175293 A1 | 8/2007 | Lin | |
| 2009/0031850 A1 | 2/2009 | Hillairet | |

(Continued)

FOREIGN PATENT DOCUMENTS

CH     686 623     5/1996

OTHER PUBLICATIONS

International Search Report dated Feb. 14, 2020.

*Primary Examiner* — Patrick Cicchino
(74) *Attorney, Agent, or Firm* — IPSILON USA, LLP

(57) ABSTRACT

An automatic cycle pedal includes a pedal body (1) rotatably mounted on a pedal axle (2). The pedal body (1) includes attachment means (3, 4) for attaching a retaining plate fixed to the bottom of a cyclist's shoe, having of a fixed front attachment member (3) and a mobile rear attachment member (4) mounted to pivot on the pedal body (1) about a rotation axis (6) between a position retaining the plate engaged between the front and rear attachment members (3, 4), and a position releasing the plate by pivoting of the rear attachment member (4) against the action of an elastic return means. The pedal further includes an adjustment system (8) for adjusting a return force of the elastic return means in order to adjust a shoe attachment/detachment tension. In accordance with the invention, the elastic return means includes a variable number of elastic members (70-72) each having one end connected to the rear attachment member (4) and another end connected to the pedal body (1), selected from a plurality of elastic members (70-72) extending between the rear attachment member (4) and the pedal body (1). The adjustment system (8) is adapted to select the elastic members constituting said elastic return means in order to achieve a predefined shoe attachment/detachment tension value.

15 Claims, 3 Drawing Sheets

(56) References Cited

U.S. PATENT DOCUMENTS

2011/0048166 A1* 3/2011 Lin .................. B62M 3/086
                                                    74/594.6
2012/0048061 A1* 3/2012 Lin .................. B29C 45/14
                                                    74/594.6

* cited by examiner

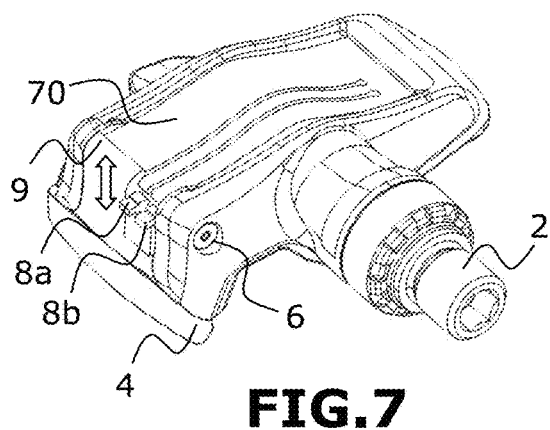
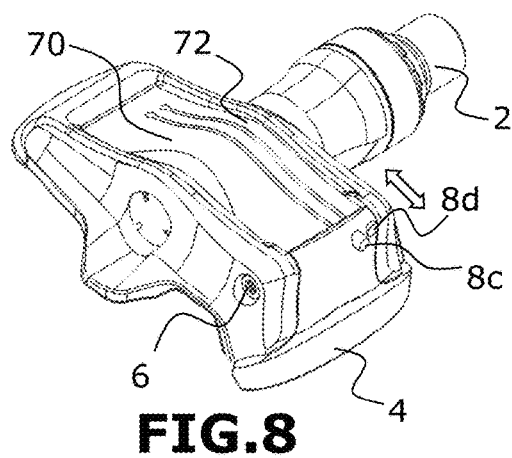
FIG.7  FIG.8
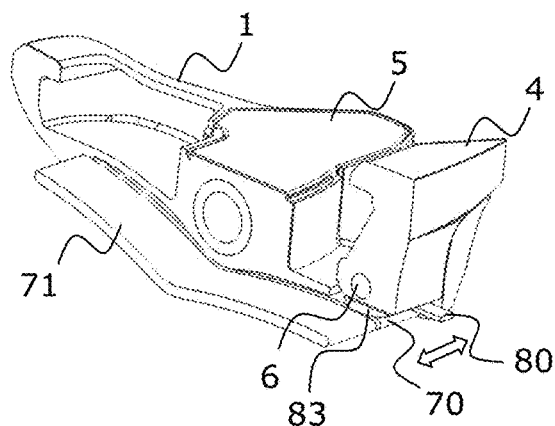
FIG.9
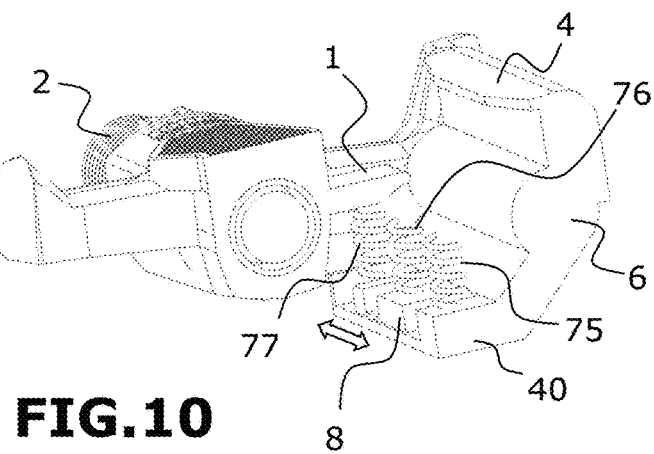
FIG.10

AUTOMATIC CYCLE PEDAL

RELATED APPLICATION

This application claims the benefit of priority from French Patent Application No. 19 05841, filed on Jun. 3, 2019, the entirety of which is incorporated by reference.

TECHNICAL FIELD

The present invention concerns an automatic cycle pedal, in particular a road cycle pedal, enabling the securing of a cyclist's shoe against the pedal.

TECHNOLOGICAL BACKGROUND

An automatic pedal classically includes a pedal body rotatably mounted on a pedal axle adapted to be connected to a pedal crank. The idea of "automatic" is linked to the fact that the shoe carries a cleat or retaining plate fixed to the bottom of the sole of the shoe of the cyclist and intended to trigger hands-free fixing simply by pressing this retaining plate against attachment means provided on the pedal. The pedal is further provided with a bearing surface above the pedal axle against which the retaining plate comes to be placed.

The attachment means provided on the pedal body generally comprise a fixed front attachment member for the retaining plate and a mobile rear attachment member mounted to pivot on the pedal body about a rotation axis parallel to the pedal axle, between a position retaining said plate engaged between the front and rear attachment members and a position releasing the plate by pivoting of said rear attachment member against the action of an elastic return means one end of which is connected to the rear attachment member and the other end of which is connected to said pedal body.

An automatic quick-connection pedal of this kind with a retaining plate is classic and is described for example in the publication FR 2 442 175.

The retaining plate is clamped onto the pedal automatically by introducing the front end of the retaining plate into the front attachment member on the pedal and by a downward pivoting movement of the plate, which causes the rear attachment member to pivot outwards against the effect of the elastic return means in order to enable the introduction of the free end of the latter into the rear attachment member. The rear attachment member thereafter returns automatically to its initial position because of the effect of the action of the elastic return means.

The unclamping of the retaining plate, that is to say the release of the latter from the pedal, is effected by a movement in rotation of the plate about a vertical axis in the vicinity of the front end of the plate, which causes pivoting of the rear attachment member, which therefore lets go. Moreover, this release of the retaining plate may also be commanded independently of the will of the cyclist in the event of a fall, if the foot of the cyclist effects the required movement; in this case the pedal has a safety and protection role.

There are known a great number of automatic pedals that differ from one another essentially by the implementation of the automatic retaining means used to connect the cleat or retaining plate to the pedal body. They all have in common that they include an elastic return means for the mobile rear attachment member that prestresses that member toward a position retaining the plate on the pedal body.

One of the ends of this elastic retaining means is therefore connected to the rear attachment member while the other end is connected to the pedal body. The elastic return member generally consists of a metal coil spring that is able to function in compression, as in the publication EP 0 146 454, or in torsion, as in the publication FR 2 620 410.

An adjustment system loading the spring more or less at one of its ends is generally present in order to adjust the shoe attachment/detachment tension. This adjustment system may include a nut and bolt system acting on one of the ends of a torsion spring, as described in the aforementioned publication FR 2 620 410, or of a compression spring, as described in the aforementioned publication EP 0 146 454. The document FR 2 850 079 moreover describes an adjustment system including a cam acting on a torsion spring.

Other known automatic pedals use an elastic return means in the form of a leafspring loaded in bending. Once again, it is possible here to adjust the shoe attachment/detachment tension by means of a system for adjusting the tension of the leafspring including either a cam or a bolt as described in particular in the publication EP 1 063 161.

All the above adjustment solutions using a bolt or a cam necessitate the use of a tool.

Finally, there is known from the publication EP 2 020 373 an automatic pedal the elastic return means of which is formed by a leafspring, for example made of carbon fibre, loaded in warping. To be more precise, the leafspring extends in a longitudinal plane relative to the pedal body so as to be loaded in warping along its longitudinal axis by the rear attachment member when the latter is pivoted toward the position releasing the retaining plate. A pedal of this type is not equipped with a system for adjusting the shoe attachment/detachment tension because it is more difficult to vary the stiffness of a leafspring loaded in warping without in particular risking this leafspring becoming detached from the pedal. If the user of the cycle wishes to modify the adjustment, the only possibility offered to them at present is to change the leafspring.

Thus none of the known solutions enables a cyclist to vary in a simple manner the shoe attachment/detachment tension of an automatic pedal, either because the integrated adjustment systems necessitate the use of a tool or because the automatic pedal has no integral adjustment system.

SUMMARY OF THE INVENTION

The present invention proposes to remedy the aforementioned disadvantages.

More particularly, one embodiment of the present invention is an automatic cycle pedal including a pedal body rotatably mounted on a pedal axle adapted to be connected to a pedal crank, said pedal body including attachment means for attaching a retaining plate fixed to the bottom of a cyclist's shoe, said attachment means consisting of a fixed front attachment member and a mobile rear attachment member mounted to pivot on said pedal body about a rotation axis substantially parallel to said pedal axle, between a position retaining said plate engaged between said front and rear attachment members, and a position freeing said plate by pivoting of said rear attachment member against the action of an elastic return means connected on the one hand to said rear attachment member and on the other hand to said pedal body, said pedal further including an adjustment system for adjusting the return force of the elastic return means in order to adjust a shoe attachment/detachment tension, characterized in that said elastic return means consists of a variable number of elastic members each having one end connected to said rear attachment member and another end connected to said pedal body, selected from a plurality of elastic members extending between the rear attachment member and the pedal body, and in that said adjustment system is adapted to select the elastic members constituting said elastic return means to achieve a predefined shoe attachment/detachment tension value.

According to other advantageous and nonlimiting features of an automatic pedal according to the invention:
- said plurality of elastic members comprises at least two elastic members of different kinds;
- at least one elastic member from said plurality of elastic members is a coil spring;
- at least one elastic member from said plurality of elastic members is an elongate elastic member extending in a longitudinal plane relative to said pedal body. For example, said elongate elastic member is a leafspring adapted, when it is selected by said adjustment system, to be loaded along its longitudinal axis in warping when the rear attachment member is pivoted toward the position releasing said retaining plate. Alternatively, said elongate elastic member is a leafspring adapted, when it is selected by said adjustment system, to be loaded in bending when the rear attachment member is pivoted toward the position releasing said retaining plate;
- the elastic members of said plurality of elastic members may extend parallel to one another;
- the elastic members of said plurality of elastic members are for example leafsprings integrated into the same single elastic leafspring assembly, or leafsprings separate from one another;
- the adjustment system may include a selection cursor mounted to be mobile in translation in a direction parallel to the rotation axis to occupy different positions;
- in one possible embodiment, each elastic member of said plurality of elastic members is a leafspring adapted, when it is selected by said adjustment system, to be loaded in warping along its longitudinal axis when the rear attachment member is pivoted toward the position releasing said retaining plate, and said selection cursor includes a longitudinal body provided with a longitudinal groove extending parallel to the rotation axis so that it is able to come to be engaged, depending on the selection position of the cursor, with a free end of each selected leafspring;
- the adjustment system may additionally or instead include a plurality of pushbuttons each adapted to interact, in the clamped position, with a different elastic member from said plurality of elastic members;
- the adjustment system may additionally or instead include a plurality of selection cursors each adapted to interact, in the selection position, with a different elastic member from said plurality of elastic members;
- said plurality of elastic members may comprise at least two elastic members with different values of stiffness;
- the adjustment system may be carried by the rear attachment member or by the pedal body.

BRIEF DESCRIPTION OF THE FIGURES

The following description with reference to the appended drawings, which are provided by way of nonlimiting example, will clearly explain in what the invention consists and how it may be reduced to practice. In the appended figures:

FIG. 7 shows a view from below of an example of an automatic pedal according to the invention with a variant embodiment of an adjustment system;

FIG. 8 shows a view from below of an example of an automatic pedal according to the invention with another variant embodiment of an adjustment system;

FIG. 9 shows a partial section as seen from above of an example of an automatic pedal according to a second embodiment of the invention;

FIG. 10 shows diagrammatically a partial section as seen from above of an example of an automatic pedal according to another embodiment of the invention.

DESCRIPTION OF EMBODIMENT(S)

Figure 1:
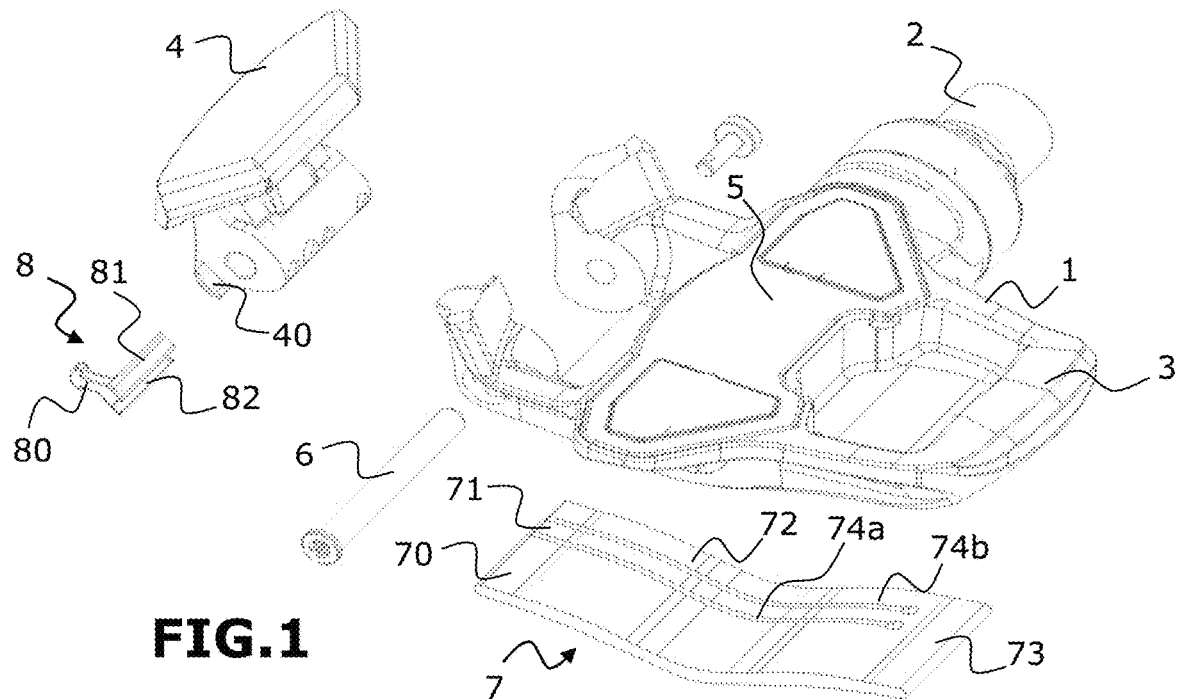
FIG. 1 shows an exploded perspective view of an example of an automatic cycle pedal according to a first embodiment of the invention.
Figure 2:
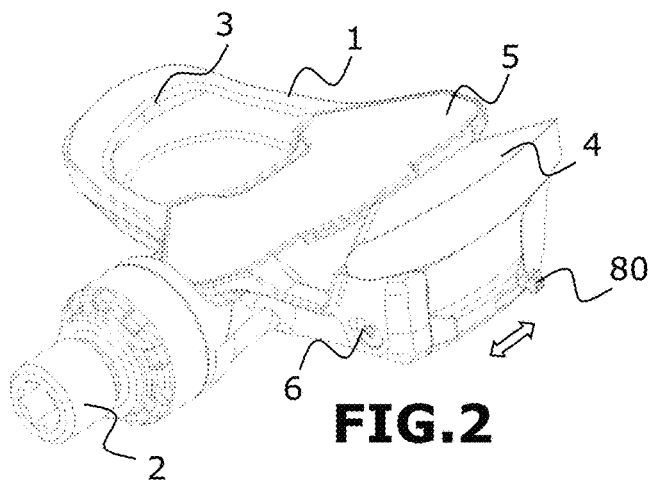
FIG. 2 shows a perspective view from above of the automatic pedal from FIG. 1 when assembled.
Figure 3:
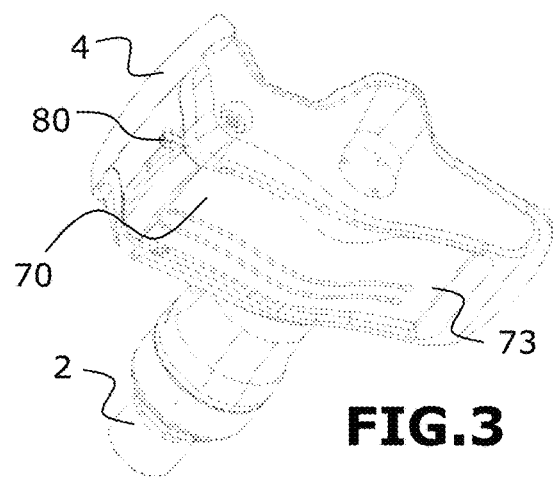
FIG. 3 shows a perspective view from below of the automatic pedal from FIG. 1 when assembled.

In the figures, identical or equivalent elements will carry the same reference signs.

A number of embodiments of an automatic pedal according to the invention will now be described. All these embodiments have in common the fact that the automatic pedal is equipped with a plurality of elastic members mounted in parallel and adapted to be activated as required to form an elastic return means opposing shoe attachment/detachment to/from a cleat or retaining plate on the automatic pedal. Adjustment of the force of the elastic return means is made possible thanks to an adjustment system making it possible to choose, from the plurality of elastic members, a greater or lesser number of elastic members constituting the elastic return means. The value of the shoe attachment/detachment tension, that is to say the return force of the elastic return means, corresponds to the sum of the return forces associated with the elastic members chosen to constitute the elastic means.

FIGS. 1 to 6, 7 and 8 show three variants of a first embodiment of the automatic pedal according to the invention in which the elastic return means consists of one or more leafsprings adapted to be loaded in warping, according to the position of an adjustment system.

The pedal classically includes a pedal body 1 rotatably mounted on a pedal axle 2 intended to be connected to a cycle pedal crank (not represented).

The pedal body 1 is provided with attachment means for attaching a cleat or retaining plate (not represented) fixed to the bottom of a cyclist's shoe (not represented).

The attachment means consist of a fixed front attachment member 3 that is able to cooperate with a male connecting member, for example a lip provided at the front of the retaining plate, and a mobile rear attachment member 4 that is able to cooperate with a female connecting member, for example an opening provided at the rear of the retaining plate.

The pedal is moreover provided with a bearing surface 5 above the pedal axle 2 against which the retaining plate comes to be placed.

The rear attachment member 4 takes the form of a lever mounted on the pedal body 1 to pivot about a rotation axis 6 substantially parallel to the pedal axle 2 between a retaining position in which the retaining plate is engaged between the front and rear attachment members 3, 4 and a release position in which the retaining plate is normally pivoted outward or inward, for example in the event of a fall.

The automatic pedal also includes a plurality of elastic members, for example three elongate elastic members 70, 71, 72, here in the form of elastic leafsprings, extending parallel to one another between the rear attachment body 4 and the pedal body 1, in a longitudinal plane relative to the pedal body 1. In the nonlimiting example represented, the three elastic leafsprings forming the three elastic members are integrated into a single elastic leafspring assembly 7 through which two cut-outs 74a and 74b extending over a part of the length of the elastic leafspring assembly 7 have been made in order to define the three leafsprings 70, 71, 72. Thus here the three leafsprings 70, 71, 72 have a common first end 73 while their second ends are separate from one another. In other embodiments entirely separate leafsprings, in other words leafsprings separated from one another, may nevertheless be envisaged without departing from the scope of the invention.

The elastic leafspring assembly and the leafsprings 70, 71, 72 constituting it preferably extend over at least two thirds of the length of the pedal, being disposed in a longitudinal housing provided in the pedal body 1. This housing is open at least toward the rear in order to enable connection of the free end of at least one of the leafsprings 70, 71, 72 to the rear attachment member 4, via an adjustment system 8, as will be explained hereinafter. The housing is provided centrally in the pedal body 1. Alternatively, this housing could be disposed laterally on the exterior side of the pedal body 1 and moreover be open downward and sideways.

The common front end 73 of the elastic leafspring assembly 7 may be fixed to and embedded in a vertical wall of the housing, but it is preferably received freely in an elongate front opening in order to avoid high loads around the attachment of the pedal body which may for example be made of injection moulded plastic material.

In the embodiment shown in the three variants from FIGS. 1 to 6, 7 and 8, only the leafspring 70 or the assembly formed by the two leafsprings 70 and 71, or again the assembly formed by the three leafsprings 70, 71 and 72 can be selected by a user from three possible tension values according to the shoe attachment/detachment tension preferred by the user. The selection is effected via the adjustment system 8 to form a single elastic return means one of the ends of which, corresponding to the free ends of the selected leafsprings, is connected to the rear attachment member 4 and the other end of which, corresponding here to the common end 73, is connected to the pedal body 1, so as to exert a return force against which the rear attachment member 4 is pivoted rearward from the position retaining to the position releasing the retaining plate.

The housing is adapted to enable each of the leafsprings 70, 71 and 72 of the leafspring assembly 7, when it is selected by the adjustment system 8, to be loaded in warping vertically downward along its longitudinal axis. In a variant not represented, the leafsprings could be configured to be loaded in warping vertically upward.

Each of the leafsprings 70, 71 and 72 of the leafspring assembly 7 is preferably prestressed in warping in order to facilitate starting loading thereof by eliminating the peak force necessary to cause the leafspring to go from a straight extension to a warped extension.

Figure 4:
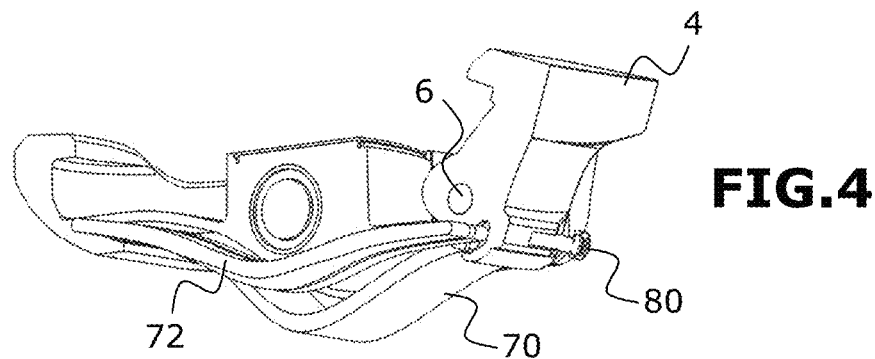
FIG. 4 shows a partial section as seen from below of the automatic pedal from FIG. 1 for a given selection position of the system for adjusting the return force of the elastic means.
Figure 5:
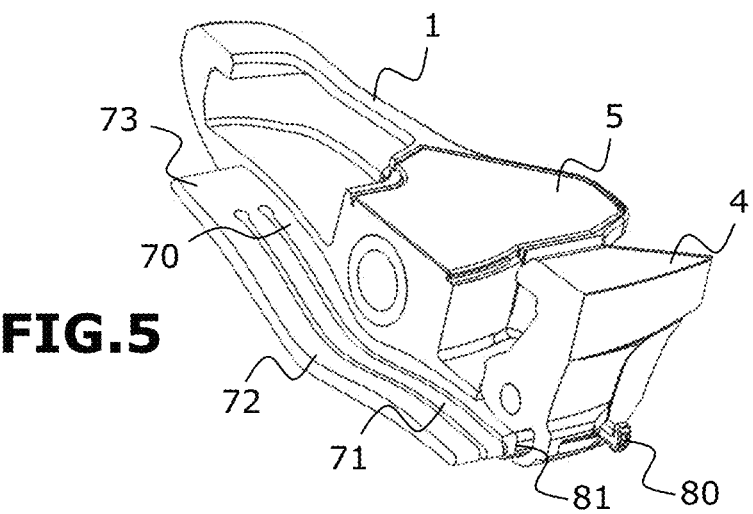
FIG. 5 shows a partial section as seen from above of the automatic pedal from FIG. 4.
Figure 6:
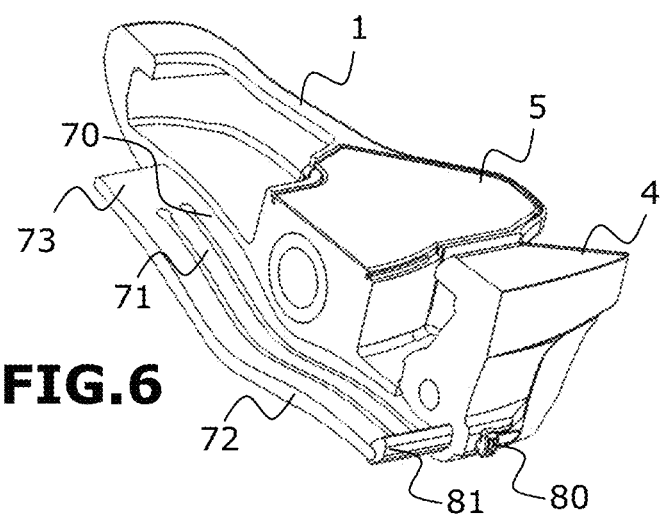
FIG. 6 shows a partial section as seen from above of the automatic pedal from FIG. 1 for another selection position of the system for adjusting the return force of the elastic means.

As can be seen in the variant embodiment shown in FIGS. 1 to 6, the adjustment system 8 may take the form of a selection cursor mounted to be mobile in translation in a direction parallel to the rotation axis 6 of the rear attachment member 4 in order to occupy different positions. This selection cursor includes a holding member 80 accessible to a user from behind the rear attachment member 4 to enable manual control of the movement in translation of the cursor to the selection position, as well as a longitudinal body 81 provided with a longitudinal groove 82 extending parallel to the rotation axis 6 so that it is able to come to be engaged, according to the selection position of the cursor, with:

only the free end of the leafspring 70, as shown in FIGS. 4 and 5; or the free end of each of the leafsprings 70 and 71;

the free end of each of the three leafsprings 70, 71 and 72, as shown in FIG. 6.

The longitudinal body 81 provided with its groove 82 is positioned to be mobile in translation in a slideway 40 provided in the lower part of the rear attachment member 4 and offset downward relative to the rotation axis 6 of the latter so that the groove is positioned in the plane of the free ends of the leafsprings 70, 71, 72. The rear ends of the leafsprings selected as a function of the position of the selection cursor are therefore freely received in the groove 82.

In the embodiment shown the slideway 40 is formed in a downward extension of the rear attachment member 4, the lower part of the slideway 40 forming a downward abutment to prevent the cursor from sliding out of the slideway.

Unlike the known systems in which a mechanism is used that comes to stress an elastic member to a greater or lesser degree, here it is possible for a user easily to choose among three possible predefined values of shoe attachment/detachment tension, namely:

a first shoe attachment/detachment tension value corresponding to the return force associated only with the leafspring 70 when the selection cursor is, as shown in FIGS. 4 and 5, in a position in which the longitudinal groove 82 of the longitudinal body 81 of the cursor is engaged only with the end of the leafspring 70;

a second shoe attachment/detachment tension value corresponding to the sum of the return forces associated with the two leafsprings 70 and 71, when the selection cursor is in an intermediate position in which the longitudinal groove 82 of the cursor is engaged with the end of each of the leafsprings 70 and 71;

a third shoe attachment/detachment tension value corresponding to the sum of the return forces associated with the three leafsprings 70 to 72 when the selection cursor is, as shown in FIG. 6, in a position in which the longitudinal groove 82 of the longitudinal body 81 of the cursor is engaged only with the end of each of the leafsprings 70, 71 and 72.

The elastic leafspring assembly 7 may advantageously be made from a composite material, for example from carbon fibres, and one may then, by the choice of the composition of the layers, obtain the stiffness value and therefore the return force that one requires for each leafspring 70, 71, 72. The advantages of a composite material leafspring assembly are, among others, excellent resistance to corrosion, as well as virtually unlimited resistance to fatigue, provided that the leafspring assembly is sized correctly.

The leafsprings 70, 71 and 72 may be identical and therefore have the same stiffness. Alternatively, as represented in FIGS. 1 to 8, the leafsprings have different widths (dimensions along the rotation axis 6) and therefore different stiffness values. For example, the leafspring 70 is a wide leafspring (for example approximately 2 cm wide) while the leafsprings 71 and 72 are identical with a smaller width (for example a width equal to approximately 0.5 cm). For example, the wide leafspring 70 has a stiffness value a while the two leafsprings 71 and 72 each have a stiffness value b. In this in no way limiting example, using the cursor a user may choose to select the adjustment tension value from three possible values, namely a, or a+b or a+b+b.

As indicated above, in other variant embodiments the various leafsprings may be entirely separate. In this case different stiffnesses may be obtained for the leafsprings by providing leafsprings of different widths and/or different materials for the leafsprings. For example, a carbon leafspring may be provided with the greatest stiffness and one or two other plastic leafsprings may be provided with lower stiffness values.

Other variant embodiments may be envisaged for producing the adjustment system 8:

Accordingly, in the variant embodiment shown in FIG. 7, the single selection cursor has been replaced by a plurality of selection cursors each adapted to interact in the selection position with a different elastic member from said plurality of elastic members. To be more precise, in the example represented the adjustment system includes a first selection cursor 8a adapted to stress the central leafspring in warping and a second selection cursor 8b adapted to stress in warping the leafspring situated farthest to the right in the figure. Each cursor 8a, 8b may be moved manually in translation in the direction of the arrow, either upward or downward according to whether the user chooses to select the associated leafsprings or not. In this nonlimiting example no cursor is associated with the leafspring 70, the latter preferably being always selected by default by a wall 9 that loads it in warping. Here the pedal from FIG. 7 is shown in a situation in which neither of the selection cursors 8a, 8b has been positioned to stress in warping the leafspring that is associated with it. The shoe attachment/detachment tension value therefore corresponds here to the return force associated only with the leafspring 70.

In another variant embodiment shown in FIG. 8, the adjustment system includes a plurality of pushbuttons each able to interact in the clamped position with a different elastic member from said plurality of elastic members. To be more precise, in the example shown, the adjustment system includes a first pushbutton 8c able to stress in warping the central leafspring and a second pushbutton 8d able to stress in warping the leafspring 72. Each pushbutton 8c, 8d is positioned facing the free end of the leafspring that is associated with it and can be clamped/unclamped by movement in translation in the direction of the arrow according to whether the user chooses to select or not the associated leafsprings. In this nonlimiting example no pushbutton is associated with the leafspring 70, the latter preferably always being selected by default. The pedal from FIG. 8 is shown here in a situation in which only the pushbutton 8d is in the operated position. The shoe attachment/detachment tension value therefore corresponds here to the sum of the return forces associated with the leafspring 70 and with the leafspring 72.

In the foregoing three variants corresponding to the first embodiment the elastic members are leafsprings that can be loaded in warping. Other embodiments are nevertheless possible because the principle of the invention is applicable whatever the nature of the elastic members used.

Accordingly, in a second embodiment represented in FIG. 9, the automatic pedal includes two leafsprings 70 and 71 that are able to loaded in bending when the rear attachment member 4 is pivoted toward the position freeing the retaining plate. In this nonlimiting example the adjustment system includes a selection cursor mounted to be mobile in translation in a direction parallel to the rotation axis 6 of the rear attachment member 4 in order to occupy different positions, as indicated by the arrow. This selection cursor includes a holding member 80 accessible to a user behind the rear attachment member 4 to enable manual driving of the movement in translation of the cursor to the selection position as well as a longitudinal body 83 extending parallel to the rotation axis 6 so that it is able to come to bear on, according to the selection position of the cursor:

only the free end of the leafspring 70; or
only the free end of the leafspring 71; or
the free end of each of the leafsprings 70 and 71.

Here the pedal from FIG. 9 is shown in a situation in which the longitudinal body 83 of the selection cursor bears only on the end of the leafspring 70 for external loading in bending of that leafspring. The shoe attachment/detachment tension value therefore corresponds here to the return force associated with the leafspring 70.

In the first embodiment the selection cursor could be replaced either by cursors moving vertically for each to act separately on the end of an associated leafspring or by pushbuttons.

FIG. 10 shows diagrammatically in partial section a third embodiment of an automatic pedal according to the invention. In this nonlimiting embodiment the elastic members of the pedal are three compression coil springs 75, 76 and 77 extending parallel to one another between the rear attachment member 4 and the pedal body 1 in a direction orthogonal to the rotation axis 6, here in a plane substantially perpendicular to a longitudinal plane of the pedal body. The spring 75 is connected at all times to a part 40 of the rear attachment member 4 so as to be active at all times. The adjustment system 8 includes a selection cursor mounted to be mobile in translation in a direction parallel to the rotation axis 6 of the rear attachment member 4 in order to occupy different positions, as indicated by the arrow. This selection cursor includes a holding member (not visible) accessible to a user from behind the rear attachment member 4 to enable manual driving of the movement in translation of the cursor to the selection position. The longitudinal body of the cursor moves in a space situated under the free ends of the springs 76 and 77 and has an upper surface conformed with zones of different heights and widths so that it is able to come to bear on, according to the selection position of the cursor:

only the free end of the spring 76, as shown in FIG. 10; or
the free end of each of the springs 76 and 77.

Here the pedal from FIG. 10 is shown in a situation in which the upper surface of the longitudinal body of the selection cursor bears only on the end of the spring 76 to load that spring in compression. The shoe attachment/detachment tension value therefore corresponds here to the sum of the return forces associated with the two springs 75 and 76.

Of course, the invention is not limited to the embodiments described and shown in the figures and numerous variants may be envisaged without departing from the scope of the present invention.

Accordingly, for example, in the various embodiments described hereinabove, the adjustment system is carried by the rear attachment member 4, but could equally well be carried by the pedal body, by reversing the positions of the elastic members.

Moreover, as indicated above, the principle of the invention is applicable whatever the nature of the elastic members used.

Accordingly, the elastic members in the same automatic pedal may in particular be leafsprings loaded in bending, leafsprings loaded in warping, compression springs, rods loaded in torsion, or any combination of those elastic member types. Thus there may in particular be provided an automatic pedal for which:

- at least one elastic member from said plurality of elastic members is a coil spring; and/or
- at least one elastic member from said plurality of elastic members is an elongate elastic member, extending in a longitudinal plane relative to the pedal body, for example a leafspring loaded in bending or in warping.

Whether the elastic members combined in the same automatic pedal are of the same kind or not, the pedal may include at least two elastic members with different stiffness values.

The elastic members combined in the same pedal all extend between the rear attachment member 4 and the pedal body 1, but are not necessarily parallel to one another. Accordingly, elastic members that are oriented differently may be combined, for example at least one first elastic member extending in a longitudinal plane relative to the pedal body and at least one second elastic member extending substantially perpendicularly relative to the first elastic member.

The various variant embodiments of the adjustment system (one or more selection cursors, pushbuttons) may be combined with one another in the same pedal.

The invention claimed is:

1. An automatic cycle pedal comprising:
a pedal body rotatably mounted on a pedal axle adapted to be connected to a pedal crank, said pedal body including attachment means for attaching a retaining plate fixed to the bottom of a cyclist's shoe, said attachment means having a fixed front attachment member and a mobile rear attachment member mounted to pivot on said pedal body about a rotation axis substantially parallel to said pedal axle, between a position retaining said plate engaged between said front and rear attachment members, and a position freeing said plate by pivoting of said rear attachment member against the action of an elastic return means connected on the one hand to said rear attachment member and on the other hand to said pedal body, said pedal further including an adjustment system for adjusting the return force of the elastic return means in order to adjust a shoe attachment/detachment tension,
wherein said elastic return means is a plurality of elastic members each having one end connected to said rear attachment member and another end connected to said pedal body, and in that said adjustment system is adapted to select one or more of said plurality of elastic members constituting said elastic return means to achieve a predefined shoe attachment/detachment tension value.

2. The automatic pedal according to claim 1, wherein at least one elastic member from said plurality of elastic members is a coil spring.

3. The automatic pedal according to claim 1, wherein at least one elastic member from said plurality of elastic members is an elongate elastic member extending in a longitudinal plane relative to said pedal body.

4. The automatic pedal according to claim 3, wherein said elongate elastic member is a leafspring adapted, when it is selected by said adjustment system, to be loaded along its longitudinal axis in warping when the rear attachment member is pivoted toward the position releasing said retaining plate.

5. The automatic pedal according to claim 3, wherein said elongate elastic member is a leafspring adapted, when it is selected by said adjustment system, to be loaded in bending when the rear attachment member is pivoted toward the position releasing said retaining plate.

6. The automatic pedal according to claim 1, wherein the elastic members of said plurality of elastic members extend parallel to one another.

7. The automatic pedal according to claim 6, wherein the elastic members of said plurality of elastic members are leafsprings integrated into the same single elastic leafspring assembly.

8. The automatic pedal according to claim 6, wherein the elastic members of said plurality of elastic members are leafsprings separate from one another.

9. The automatic pedal according to claim 6, wherein the adjustment system includes a selection cursor mounted to be mobile in translation in a direction parallel to the rotation axis to occupy different positions.

10. The automatic pedal according to claim 9, wherein each elastic member of said plurality of elastic members is a leafspring adapted, when it is selected by said adjustment system, to be loaded in warping along its longitudinal axis when the rear attachment member is pivoted toward the position releasing said retaining plate, and in that said selection cursor includes a longitudinal body provided with a longitudinal groove extending parallel to the rotation axis so that it is able to come to be engaged, depending on the selection position of the cursor, with a free end of each selected leafspring.

11. The automatic pedal according to claim 1, wherein the adjustment system includes a plurality of pushbuttons each adapted to interact, in the clamped position, with a different elastic member from said plurality of elastic members.

12. The automatic pedal according to claim 1, wherein the adjustment system includes a plurality of selection cursors each adapted to interact, in the selection position, with a different elastic member from said plurality of elastic members.

13. The automatic pedal according to claim 1, wherein said plurality of elastic members comprises at least two elastic members with different values of stiffness.

14. The automatic pedal according to claim 1, wherein the adjustment system is carried by the rear attachment member.

15. The automatic pedal according to claim 1, wherein the adjustment system is carried by the pedal body.

* * * * *